United States Patent
Gerdes et al.

(10) Patent No.: US 11,218,355 B2
(45) Date of Patent: *Jan. 4, 2022

(54) MULTI-DIMENSIONAL SIGNAL ENCODING

(71) Applicant: TM IP HOLDINGS, LLC, Tucson, AZ (US)

(72) Inventors: Richard C. Gerdes, Tucson, AZ (US); Harvey C. Woodsum, Bedford, NH (US)

(73) Assignee: TM IP HOLDINGS, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,314

(22) Filed: Sep. 14, 2020

(65) Prior Publication Data

US 2020/0412595 A1    Dec. 31, 2020

Related U.S. Application Data

(63) Continuation of application No. 16/453,589, filed on Jun. 26, 2019, now Pat. No. 10,778,497, which is a (Continued)

(51) Int. Cl.
*H04L 27/36* (2006.01)
*H04L 27/20* (2006.01)
(Continued)

(52) U.S. Cl.
CPC .......... *H04L 27/36* (2013.01); *H04L 27/0008* (2013.01); *H04L 27/122* (2013.01);
(Continued)

(58) Field of Classification Search
CPC ..... H04L 27/36; H04L 27/0008; H04L 27/34; H04L 27/2092; H04L 27/122; H04L 27/38
See application file for complete search history.

(56) References Cited

U.S. PATENT DOCUMENTS 3,706,945 A    12/1972   Yanagidaira et al.
3,944,928 A     3/1976   Augenblick et al.
(Continued)

FOREIGN PATENT DOCUMENTS

JP    H0563594       3/1993
WO    WO2004040403   5/2004
(Continued)

OTHER PUBLICATIONS

U.S. Appl. No. 15/491,569, Woodsum et al., filed Apr. 19, 2017.
(Continued)

*Primary Examiner* — Kenneth T Lam
(74) *Attorney, Agent, or Firm* — Hayes Soloway P.C.

(57) ABSTRACT

Methods, systems, and apparatus, including computer programs encoded on a computer storage medium, for communicating signals using a multi-dimensional symbol constellation. In one example, a process for modulating a carrier signal includes the actions of mapping data to symbols of a multi-dimensional symbol constellation that includes at least three dimensions, each dimension of the constellation represented by a respective modulation signal. The dimensions of the constellation include first and second dimensions each of which are represented by respective in-phase modulation values and quadrature phase modulation values of a quadrature amplitude modulation (QAM) signal, and a third dimension represented by a transpositional modulation (TM) signal. The method further includes modulating a carrier signal with the TM signal and the QAM signal.

18 Claims, 6 Drawing Sheets

Related U.S. Application Data continuation of application No. 15/816,940, filed on Nov. 17, 2017, now Pat. No. 10,341,161.

(60) Provisional application No. 62/530,568, filed on Jul. 10, 2017.

(51) Int. Cl.
    *H04L 27/12* (2006.01)
    *H04L 27/38* (2006.01)
    *H04L 27/34* (2006.01)
    *H04L 27/00* (2006.01)

(52) U.S. Cl.
    CPC .......... *H04L 27/2092* (2013.01); *H04L 27/34* (2013.01); *H04L 27/38* (2013.01)

(56) References Cited

U.S. PATENT DOCUMENTS

| | | |
|---|---|---|
| 3,968,486 A | 7/1976 | Gerdes |
| 4,259,888 A | 4/1981 | Gross |
| 4,301,415 A | 11/1981 | McFayden |
| 4,613,974 A * | 9/1986 | Vokac ................ H04L 27/00 329/311 |
| 4,680,633 A | 7/1987 | Gerdes et al. |
| 4,989,219 A | 1/1991 | Gerdes et al. |
| 5,021,786 A | 6/1991 | Gerdes |
| 5,119,391 A | 6/1992 | Maed et al. |
| 5,124,706 A | 6/1992 | Gerdes |
| 5,184,218 A | 2/1993 | Gerdes |
| 5,200,715 A | 4/1993 | Gerdes et al. |
| 5,327,237 A | 7/1994 | Gerdes et al. |
| 5,511,100 A | 4/1996 | Lundberg et al. |
| 5,557,333 A | 9/1996 | Jungo et al. |
| 5,675,590 A | 10/1997 | Alamouti |
| 6,052,410 A | 4/2000 | Okita |
| 6,173,062 B1 | 1/2001 | Dibachi et al. |
| 6,522,697 B1 | 2/2003 | Spickermann |
| 6,559,757 B1 | 5/2003 | Deller et al. |
| 6,639,950 B1 | 10/2003 | Lagerblom et al. |
| 6,788,154 B2 | 9/2004 | Maneatis |
| 7,319,427 B2 * | 1/2008 | Wicks ................ G01S 13/9054 342/372 |
| 7,340,001 B2 | 3/2008 | Smith et al. |
| 7,856,050 B1 | 12/2010 | Wiss et al. |
| 7,991,070 B2 | 8/2011 | Batshon et al. |
| 8,472,514 B2 | 6/2013 | Dabiri et al. |
| 8,537,952 B1 | 9/2013 | Arora |
| 8,675,769 B1 | 3/2014 | Eliaz et al. |
| 8,719,656 B2 | 5/2014 | Arabaci et al. |
| 9,014,293 B2 | 4/2015 | Gerdes |
| 9,194,946 B1 | 11/2015 | Vacanti |
| 9,338,041 B1 | 5/2016 | Gerdes |
| 9,338,042 B1 | 5/2016 | Gerdes |
| 9,379,925 B2 | 6/2016 | Gerdes |
| 9,426,014 B1 | 8/2016 | Gerdes |
| 9,455,852 B1 | 9/2016 | Gerdes |
| 9,455,863 B1 | 9/2016 | Gerdes |
| 9,461,854 B1 | 10/2016 | Gerdes |
| 9,473,983 B1 | 10/2016 | Gerdes et al. |
| 9,515,815 B2 | 12/2016 | Gerdes |
| 9,516,490 B1 | 12/2016 | Gerdes et al. |
| 9,621,275 B2 | 4/2017 | Kojima et al. |
| 9,621,386 B2 | 4/2017 | Gerdes |
| 9,621,398 B2 | 4/2017 | Gerdes |
| 9,628,318 B1 | 4/2017 | Gerdes et al. |
| 9,716,997 B1 | 7/2017 | Gerdes et al. |
| 9,787,510 B2 | 10/2017 | Gerdes |
| 9,882,764 B1 | 1/2018 | Woodsum et al. |
| 10,341,161 B2 * | 7/2019 | Gerdes ................ H04L 27/36 |
| 10,778,497 B2 * | 9/2020 | Gerdes ................ H04L 27/122 |
| 2001/0038309 A1 | 11/2001 | Hagemeyer |
| 2002/0039887 A1 | 4/2002 | Delabbaye et al. |
| 2003/0053794 A1 | 3/2003 | Krouglov et al. |
| 2003/0071684 A1 | 4/2003 | Noori |
| 2003/0142741 A1 | 7/2003 | Hartmann |
| 2004/0247041 A1 | 12/2004 | Biedka et al. |
| 2004/0252531 A1 | 12/2004 | Cheng et al. |
| 2005/0123061 A1 * | 6/2005 | Smith ................ H04L 27/00 375/261 |
| 2005/0200391 A1 | 9/2005 | Steinbach et al. |
| 2006/0006914 A1 | 1/2006 | Fan-Jiang |
| 2006/0197564 A1 | 9/2006 | Yen |
| 2006/0291589 A1 | 12/2006 | Eliezer et al. |
| 2007/0041485 A1 | 2/2007 | Chang |
| 2008/0253479 A1 | 10/2008 | Davidow et al. |
| 2009/0154589 A1 | 6/2009 | Monnerie et al. |
| 2009/0168917 A1 | 7/2009 | Noda et al. |
| 2010/0002751 A1 | 1/2010 | Dent |
| 2010/0128713 A1 | 5/2010 | Le Bars et al. |
| 2011/0043039 A1 | 2/2011 | Mancebo |
| 2011/0051780 A1 | 3/2011 | Kawasaki et al. |
| 2011/0151821 A1 | 6/2011 | Sorrells et al. |
| 2011/0222621 A1 | 9/2011 | Christensen et al. |
| 2012/0171963 A1 | 7/2012 | Tsfaty |
| 2013/0121442 A1 | 5/2013 | Baik et al. |
| 2014/0201212 A1 | 7/2014 | Qi et al. |
| 2014/0269861 A1 | 9/2014 | Eliaz et al. |
| 2014/0269969 A1 | 9/2014 | Gerdes |
| 2015/0023456 A1 | 1/2015 | Vann et al. |
| 2015/0200796 A1 | 7/2015 | Gerdes |
| 2016/0105302 A1 | 4/2016 | Madaiah |
| 2016/0173302 A1 * | 6/2016 | Gerdes ................ H04L 27/12 375/295 |
| 2016/0197751 A1 | 7/2016 | Gerdes |
| 2017/0026211 A1 | 1/2017 | Gerdes |
| 2017/0033968 A1 | 2/2017 | Gerdes |
| 2017/0085404 A1 | 3/2017 | Gerdes |
| 2017/0214560 A1 | 7/2017 | Gerdes et al. |
| 2017/0214563 A1 | 7/2017 | Gerdes et al. |
| 2017/0310526 A1 | 10/2017 | Gerdes |
| 2017/0311205 A1 | 10/2017 | Gerdes |
| 2017/0325085 A1 | 11/2017 | Gerdes |
| 2018/0123839 A1 | 5/2018 | Chung et al. |
| 2019/0013990 A1 | 1/2019 | Gerdes et al. |
| 2019/0319828 A1 | 10/2019 | Gerdes et al. |

FOREIGN PATENT DOCUMENTS

| | | |
|---|---|---|
| WO | WO2012082781 | 6/2012 |
| WO | WO2014143046 | 9/2014 |
| WO | WO2014145868 | 9/2014 |
| WO | WO2017019130 | 2/2017 |
| WO | WO2017019131 | 2/2017 |

OTHER PUBLICATIONS

PCT International search Report and Written Opinion in International Application No. PCT/US2018/041318, dated Sep. 27, 2018, 13 pages.

PCT International Preliminary Report on Patentability in International Application No. PCT/US2018/041,318, dated Jan. 23, 2020, 8 pages.

Evans et al., "The Rapidly Deployable Radio Network", IEEE Journal on Selected Areas in Communications,IEEE Service Center, vol. 17, No. 4, Apr. 1999, 689-703.

Leclerc et al., "Performance analysis of an in-band COFDM / FM digital audio broadcasting system", Electrical and Computer Engineering, Sep. 1993, 652-655.

Scarlart et al., "Performance Analysis of a COFDM/FM In-band Digital Audio Broadcasting System", IEEE Transactions on Broadcasting, IEEE Service Center, Piscataway, NJ, US; vol. 43, No. 2, Jun. 1997, 191-198.

Chiu et al., "A 900 MHz UHF RFID Reader Transceiver IC", IEEE Journal of Solid-State Circuits, IEEE Service Center, Piscataway, NJ, USA vol. 42, No. 12, Dec. 2007, 2822-2833.

(56) References Cited

OTHER PUBLICATIONS

Liu et al., "High Order QAM Signals Recognition Based on Layered Modulation", ICCCAS 2009. International Conference on Commumcations, Circuits and Systems, IEEE, Jul. 2009, 73-76.

* cited by examiner

MULTI-DIMENSIONAL SIGNAL ENCODING

CROSS REFERENCE TO RELATED APPLICATIONS

This application is a continuation of U.S. patent application Ser. No. 16/453,589, filed Jun. 26, 2019, which is a continuation of U.S. patent application Ser. No. 15/816,940, filed Nov. 17, 2017, now U.S. Pat. No. 10,341,161, which claims priority under 35 U.S.C. § 119 to U.S. Provisional Patent Application No. 62/530,568, filed Jul. 10, 2017, which are hereby incorporated by reference in their entirety.

BACKGROUND

Carrier modulation techniques are used to transmit information signals from one location to another. Traditional signal modulation techniques include, for example, amplitude modulation (AM), frequency modulation (FM), and phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM). Transpositional Modulation, or TM is a type of modulation in which information is conveyed by altering (e.g., transposing, time shifting) a harmonic of a carrier signal.

SUMMARY

This specification relates to methods and systems for encoding and decoding communication signals for conducting electronic communications using a combined traditional modulation and TM signal. More specifically, the specification relates to methods and systems for encoding and decoding a communication signal using a multi-dimensional symbol constellation whose coordinates are associated with a traditional modulation signal and a TM signal. Although discussed in the context of TM, implementations of the present disclosure also may be applicable to identifying other aspects or characteristics of various devices.

In a first aspect, the disclosure features a method of modulating a carrier signal that includes the actions of mapping data to symbols of a multi-dimensional symbol constellation that includes at least three dimensions, each dimension of the constellation represented by a respective modulation signal. The dimensions of the constellation include first and second dimensions each of which are represented by respective in-phase modulation values and quadrature phase modulation values of a quadrature amplitude modulation (QAM) signal, and a third dimension represented by a transpositional modulation (TM) signal. The method further includes modulating a carrier signal with the TM signal and the QAM signal. Other implementations of this aspect include corresponding communication devices, systems, apparatus, and transmitters configured to perform the actions of the method, and computer programs including instructions encoded on computer storage devices to perform the actions of the method.

In a second aspect, the disclosure features a method of modulating a carrier signal that includes the actions of mapping bits of an input data stream to symbols of a multi-dimensional symbol constellation that includes at least three dimensions, symbol coordinates in two of the at least three dimensions are represented by in-phase and quadrature phase coordinates of a quadrature amplitude modulation (QAM) constellation and symbol coordinates in a third dimension are represented by a transpositional modulation (TM) signal. The method further includes modulating a carrier signal with the TM signal and with the in-phase and quadrature phase coordinates of the QAM signal. Other implementations of this aspect include corresponding communication devices, systems, apparatus, and transmitters configured to perform the actions of the method, and computer programs including instructions encoded on computer storage devices to perform the actions of the method.

In a third aspect, the disclosure features a method of modulating a carrier signal that includes the actions of mapping data to symbols of a multi-dimensional constellation that includes at least two dimensions, the symbols of the constellation are represented by a respective sets of coordinates that each include a first coordinate associated with a non-TM signal, and a second coordinate associated with a transpositional modulation (TM) signal. The method further includes modulating a carrier signal with the non-TM signal and the TM signal. Other implementations of this aspect include corresponding communication devices systems, apparatus, and transmitters configured to perform the actions of the method, and computer programs including instructions encoded on computer storage devices to perform the actions of the method.

In a fourth aspect, the disclosure features a method of modulating a carrier signal that includes the actions of mapping data to symbols of a multi-dimensional constellation that includes at least three dimensions, the symbols of the constellation are represented by a respective sets of coordinates that each include a first coordinate associated with a first signal, a second coordinate associated with a second signal, and a third coordinate associated with a third signal. At least one of the first, second, and third signal is a transpositional modulation (TM) signal. The method further includes modulating a carrier signal with the first, second, and third signals. Other implementations of this aspect include corresponding communication devices, systems, apparatus, and transmitters configured to perform the actions of the method, and computer programs including instructions encoded on computer storage devices to perform the actions of the method.

These and other implementations can each optionally include one or more of the following features. In some implementations, the multi-dimensional constellation includes four dimensions, where the respective sets of coordinates each further include a fourth coordinate associated with a second TM signal, the first and second signals are respective in-phase and quadrature-phase portions of a QAM signal and the third signal is a first TM signal, and where modulating the carrier signal comprises modulating the carrier signal with the QAM signal, the first TM signal, and the second TM signal.

In some implementations, the multi-dimensional constellation includes four dimensions, where the respective sets of coordinates each further include a fourth coordinate associated with one of a phase value or an amplitude value of the TM signal, and where the third coordinate of each of the respective sets of coordinates is associated with the other one of a phase value or an amplitude value of the TM signal.

In some implementations, the multi-dimensional symbol constellation includes a plurality of layers of two-dimensional QAM constellations and modulation values of the TM signal represent particular QAM constellation layers.

In some implementations, the multi-dimensional symbol constellation includes at least four layers of 16-ary QAM constellations.

In some implementations, the multi-dimensional symbol constellation includes at least eight layers of 256-ary QAM constellations.

In some implementations, adjacent symbols in the multi-dimensional constellation are encoded using Gray coding.

In some implementations, the method includes encoding the data using an error correction coding scheme before mapping the data to symbols of the multi-dimensional constellation.

In some implementations, the second coordinate of each of the respective sets of coordinates is associated a phase value the TM signal and the third coordinate of each of the respective sets of coordinates is associated an amplitude value the TM signal.

In some implementations, the first signal is an amplitude modulation signal, a frequency modulation signal, or a phase modulation signal.

In a fifth aspect, the disclosure features a method of demodulating a carrier signal that includes the actions of receiving a combined signal including a carrier signal modulated with a quadrature amplitude modulated (QAM) signal and a transpositional modulated (TM) signal, the combined signal encoding data in a multi-dimensional symbol constellation that has at least three dimensions. Separating the TM signal from the QAM signal. Demodulating the QAM signal to obtain first and second coordinates of a symbol. Demodulating the TM signal to obtain a third coordinate of the symbol. Other implementations of this aspect include corresponding communication devices, systems, apparatus, and transmitters configured to perform the actions of the method, and computer programs including instructions encoded on computer storage devices to perform the actions of the method.

In a sixth aspect, the disclosure features a method of demodulating a carrier signal that includes the actions of receiving a combined signal including a carrier signal modulated with a quadrature amplitude modulated (QAM) signal and a transpositional modulated (TM) signal, the combined signal encoding digital data in a multi-dimensional symbol constellation that has at least three dimensions. Separating the TM signal from the QAM signal. Demodulating the QAM signal to obtain first and second portions of the digital data. Demodulating the TM signal to obtain a third portion of the digital data. Other implementations of this aspect include corresponding communication devices, systems, apparatus, and transmitters configured to perform the actions of the method, and computer programs including instructions encoded on computer storage devices to perform the actions of the method.

These and other implementations can each optionally include one or more of the following features.

In some implementations, the method includes mapping the first, second, and third coordinates of the symbol to a pattern of bits associated with the symbol.

In some implementations, the TM signal is a first TM signal and the carrier signal includes an in-phase portion modulated with the first TM signal and a quadrature-phase portion modulated with the second TM signal, and demodulating the TM signal includes demodulating the first TM signal to obtain the third coordinate of the symbol, and demodulating the second TM signal to obtain a fourth coordinate of the symbol.

In some implementations, demodulating the TM signal includes demodulating a phase value of the TM signal to obtain the third coordinate of the symbol, and demodulating an amplitude value of the TM signal to obtain a fourth coordinate of the symbol.

In some implementations, the multi-dimensional symbol constellation includes a plurality of layers of two-dimensional QAM constellations and modulation values of the TM signal represent particular QAM constellation layers.

In some implementations, the multi-dimensional symbol constellation includes at least four layers of 16-ary QAM constellations.

In some implementations, the multi-dimensional symbol constellation includes at least eight layers of 256-ary QAM constellations.

In some implementations, adjacent symbols in the multi-dimensional constellation are encoded using Gray coding.

In a seventh aspect, the disclosure features a method of demodulating a carrier signal that includes the actions of receiving a combined signal including a carrier signal modulated with a transpositional modulated (TM) signal and a non-TM signal, the combined signal encoding digital data in a multi-dimensional symbol constellation. Separating the TM signal from the non-TM signal. Demodulating the non-TM signal to obtain a first coordinate of a symbol. Demodulating the TM signal to obtain a second coordinate of the symbol. Other implementations of this aspect include corresponding communication devices, systems, apparatus, and transmitters configured to perform the actions of the method, and computer programs including instructions encoded on computer storage devices to perform the actions of the method.

These and other implementations can each optionally include one or more of the following features. In some implementations, the method includes mapping the first and second coordinates of the symbol to a pattern of bits associated with the symbol.

In some implementations, the TM signal is a first TM signal and the carrier signal includes an in-phase portion modulated with the first TM signal and a quadrature-phase portion modulated with the second TM signal, and demodulating the TM signal includes demodulating the first TM signal to obtain the second coordinate of the symbol, and demodulating the second TM signal to obtain a third coordinate of the symbol.

In some implementations, demodulating the TM signal includes demodulating a phase value of the TM signal to obtain the second coordinate of the symbol, and demodulating an amplitude value of the TM signal to obtain a third coordinate of the symbol.

In some implementations, the multi-dimensional symbol constellation includes a plurality of layers of two-dimensional QAM constellations and modulation values of the TM signal represent particular QAM constellation layers.

In some implementations, the multi-dimensional symbol constellation includes at least four layers of 16-ary QAM constellations.

In some implementations, the multi-dimensional symbol constellation includes at least eight layers of 256-ary QAM constellations.

In some implementations, adjacent symbols in the multi-dimensional constellation are encoded using Gray coding.

Particular implementations of the subject matter described in this specification can be implemented so as to realize one or more of the following advantages. Implementations may permit the expansion of signal constellations from two-dimensions (such as traditional QAM constellations) to three or more dimensions, and thereby, increase the number of bits that can be represented by individual symbols of the constellations. Implementations may increase the data rate of signals transmitted using traditional modulation schemes. Implementations may provide higher rates of data transmission by utilizing additional dimension(s) of the transmitted signal space to carry the additional information. Implementations may increase the data throughput of individual wired or wireless data links.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
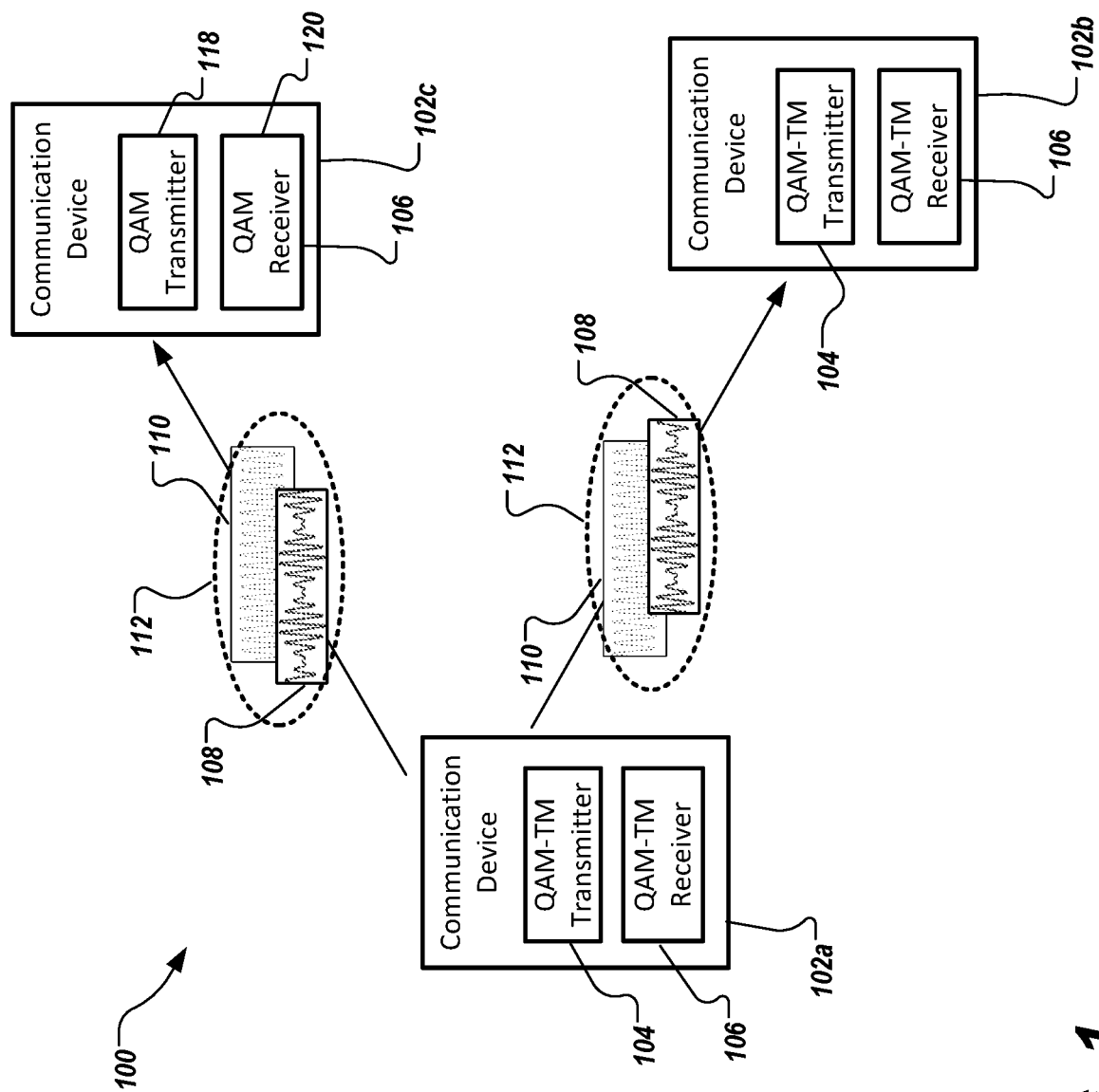
FIG. 1 depicts an example system in accordance with implementations of the present disclosure.

Implementations of the present disclosure generally relate to methods and systems for encoding data in multi-dimensional symbol constellations. More specifically, the specification relates to methods and systems for encoding and decoding a data signal using a multi-dimensional symbol constellation whose coordinates are associated with a traditional modulation signal and a transpositional modulating (TM) signal. Implementations of the present disclosure generally relate to methods and systems for encoding digital data by mapping the digital data to symbols of a multi-dimensional symbol constellation that includes three or more dimensions. Each dimension of the constellation is represented modulation values or levels of a modulation signal. For example, in a three-dimensional symbol constellation, symbol coordinates in a first and second dimension can each be associated with respective in-phase and quadrature-phase values of a non-TM signal such as a quadrature amplitude modulation (QAM) signal, and symbol coordinates in a third coordinate can be associated with a values of a TM signal. Each symbol of the constellation represents a set of bits (e.g., an N-bit binary number) of the data signal, and is itself represented by a set of coordinates within the constellation. A carrier signals is modulated with the QAM and the TM signal.

As used herein the terms "Transpositional Modulation," "TM modulation," "TM," and "TM signal" refer to techniques of adding information to a carrier signal without affecting the amplitude, frequency or phase of the carrier signal (or a signal that is modulated according to such a technique) as observed by a traditional receiver or demodulator (e.g., a non-TM capable receiver/demodulator). Transpositional modulation can be generated by several techniques. For example, in a "wide-band TM modulation" technique information is conveyed by modulating the inflection points of a carrier wave to represent data. For example, in a "harmonic TM modulation" technique information is conveyed by altering (e.g., transposing, time shifting) a harmonic of a carrier signal. For example, Transpositional Modulation can be produced by altering a third harmonic or other harmonics of a carrier signal (e.g., a fourth harmonic, fifth harmonic, sixth harmonic, etc.). For example, in an "internal TM modulation" technique information is conveyed by altering a periodic signal (an "internal TM modulation signal") which is applied to the carrier signal. Any effects of the TM internal modulation signal on either the carrier wave itself or another traditional modulation signal (e.g., non-TM signal) carried by the carrier wave cancel over the symbol frame of a non-TM modulation signal, and consequently, are not detectable by a traditional signal demodulator. Examples of documents that describe techniques for performing TM modulation and demodulation and/or uses of transpositional modulation include, but are not limited to, U.S. Pat. No. 9,014,293 entitled "TRANSPOSITIONAL MODULATION SYSTEMS AND METHODS;" U.S. Pat. No. 9,338,041 entitled "EXTRACTING CARRIER SIGNALS FROM MODULATED SIGNALS;" U.S. Pat. No. 9,338,042 entitled "SEPARATING AND EXTRACTING MODULATED SIGNALS;" U.S. Pat. No. 9,473,983 entitled "TRANSPOSITIONAL MODULATION COMMUNICATIONS BETWEEN DEVICES;" U.S. Pat. No. 9,515,815 entitled "TRANSPOSITIONAL MODULATION SYSTEMS, METHODS AND DEVICES;" U.S. Pat. No. 9,516,490 entitled "IDENTIFYING DEVICES WITH TRANSPOSITIONAL MODULATION;" U.S. Pat. No. 9,628,318 entitled "TRANSPOSITIONAL MODULATION COMMUNICATIONS;" and U.S. patent application Ser. No. 15/491,569 entitled "TRANSPOSITIONAL MODULATION." TM signals generated by each of the above techniques share the same characteristics in that the TM signals add information to a carrier signal without affecting the amplitude, frequency or phase of the carrier signal as observed by a traditional demodulator (e.g., non-TM demodulator) and the TM signals are not detectable by traditional demodulators, for example, those used for amplitude, frequency, or phase modulated signals.

FIG. 1 depicts an example system 100 in accordance with implementations of the present disclosure. The system 100 is a system of communication devices 102a, 102b, and 102c. The system 100 may be a radio frequency (RF) communication system, a satellite communication system, a landline communication system (e.g., a telephony or cable network), an optical communication system, a computer network, or any other system of communication devices. The communication devices 102 include systems for modulating a carrier signal with an information signal using traditional modulation techniques and transmitting and receiving the modulated signal from one communication device 102 to/from another. For example, communication device 120a may be a cellular base station, and communication devices 102b and 102c may be mobile devices (e.g., smartphones).

Communication devices 102a and 102b include transmitters 104 for modulating a carrier signal with an information signal using both traditional modulation techniques (e.g., QAM) and TM techniques, and receivers 106 for receiving both traditionally modulated and TM signals. More specifically, communication devices 102a and 102b include a combined QAM-TM transmitter 104 and a combined QAM-TM receiver 106. Communication device 102c includes a transmitter 118 for modulating a carrier signal with an information signal using only traditional modulation techniques, and a receiver 120 for receiving traditionally modulated signals (e.g., QAM signals). More specifically, communication device 102c includes a QAM transmitter 118 and a QAM receiver 120. Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). The various transmitters 104, 118 and/or receivers 106, and 120 can be implemented as hardware devices (e.g., integrated circuits, chip-sets, application specific integrated circuits (ASIC) or field programmable logic arrays (FPGA)) or they can be implemented in software (e.g., as a software defined radio (SDR)).

Communication devices 102a and 102b can transmit and receive signals that include non-TM (e.g., traditionally modulated) signals 108 combined with TM modulated signals 110 on the same carrier. The combined signal 112 provides an increased data rate over either the non-TM signal 108 or TM signal 110 alone because the non-TM signal and TM signal are transparent to each other. The QAM-TM receiver 106 can separate the TM signal 110 from the combined signal and demodulate the TM signal 110. Likewise, QAM-TM receiver 106 can separately demodulate the traditionally modulated signal 108 (e.g., QAM signal) with no significant interference caused by the TM modulated signal 110. This is possible because TM modulated signals are undecipherable by non-TM receivers, instead appearing as a slight increase of noise in traditionally modulated signals.

For example, communication device 102a may transmit a combined QAM-TM signal 112 to communication device 102b. Communication device 102b can then receive the combined signal 112. The QAM-TM receiver 106 in communication device 102b is used to detect and demodulate the non-TM signal 108, and to separate and demodulate the TM signal 110 from the combined signal 112. On the other hand, communication device 102c, which does not have a TM capable receiver, will only detect and demodulate the traditionally modulated signal 108; not the TM modulated signal 110.

Systems and techniques for modulating and demodulating TM signals are described in U.S. patents and patent applications listed above. More specifically, U.S. Pat. Nos. 9,014,293 and 9,515,815 describe several systems and methods for producing and demodulating TM signals including the above noted "wide-band" and "harmonic" modulation techniques, among others. U.S. Pat. Nos. 9,014,293 and 9,515,815 are each incorporated herein by reference in their entirety. U.S. Pat. No. 9,338,042 describes systems and methods for separating TM signals from combined signals as well as TM modulation and demodulation using "harmonic" modulation techniques. U.S. Pat. No. 9,338,042 is incorporated herein by reference in its entirety. U.S. patent application Ser. No. 15/491,569 describes systems and methods for producing and demodulating TM signals using the above noted "internal TM modulation" technique. U.S. patent application Ser. No. 15/491,569 is incorporated herein by reference in its entirety.

Transpositional modulation can be used to increase the overall data throughput of communication systems, such as system 100, by using the TM signal 110 as an additional communication layer of existing channels. For example, as described in U.S. Pat. Nos. 9,338,042; 9,473,983; 9,515,815; 9,516,490; and 9,628,318, a TM signal 110 can be added to a carrier signal along with a non-TM signal 108, and can be used to transmit an information stream separate from an information stream carried by the non-TM signal 108. In other words, the TM signal 110 can be used to carry an additional information stream that is independent of an information stream carried by a non-TM signal 108 on the same carrier. Accordingly, the TM signal 110 and non-TM signal 108 in a combined signal 112 can be used to send different information to separate receiving devices.

In some implementations, as disclosed herein, transpositional modulation can be used to increase the data throughput of communication systems, such as system 100, by using the TM signal 110 to provide an expanded symbol constellation for the non-TM signal 108, thereby, increasing the overall data rate for transmitting a common information stream between two communication devices. In other words, both the TM signal 110 and the non-TM signal in a single combined signal 112 can be used to encode portions of a common information signal. For purposes of illustration, techniques for encoding portions of a common information signal in a TM signal and a non-TM signal are described in reference to TM and QAM signals. In other implementations, however, multi-dimensional symbol constellations can be represented by a combination of TM signals and non-TM signals other than QAM.

Figure 2:
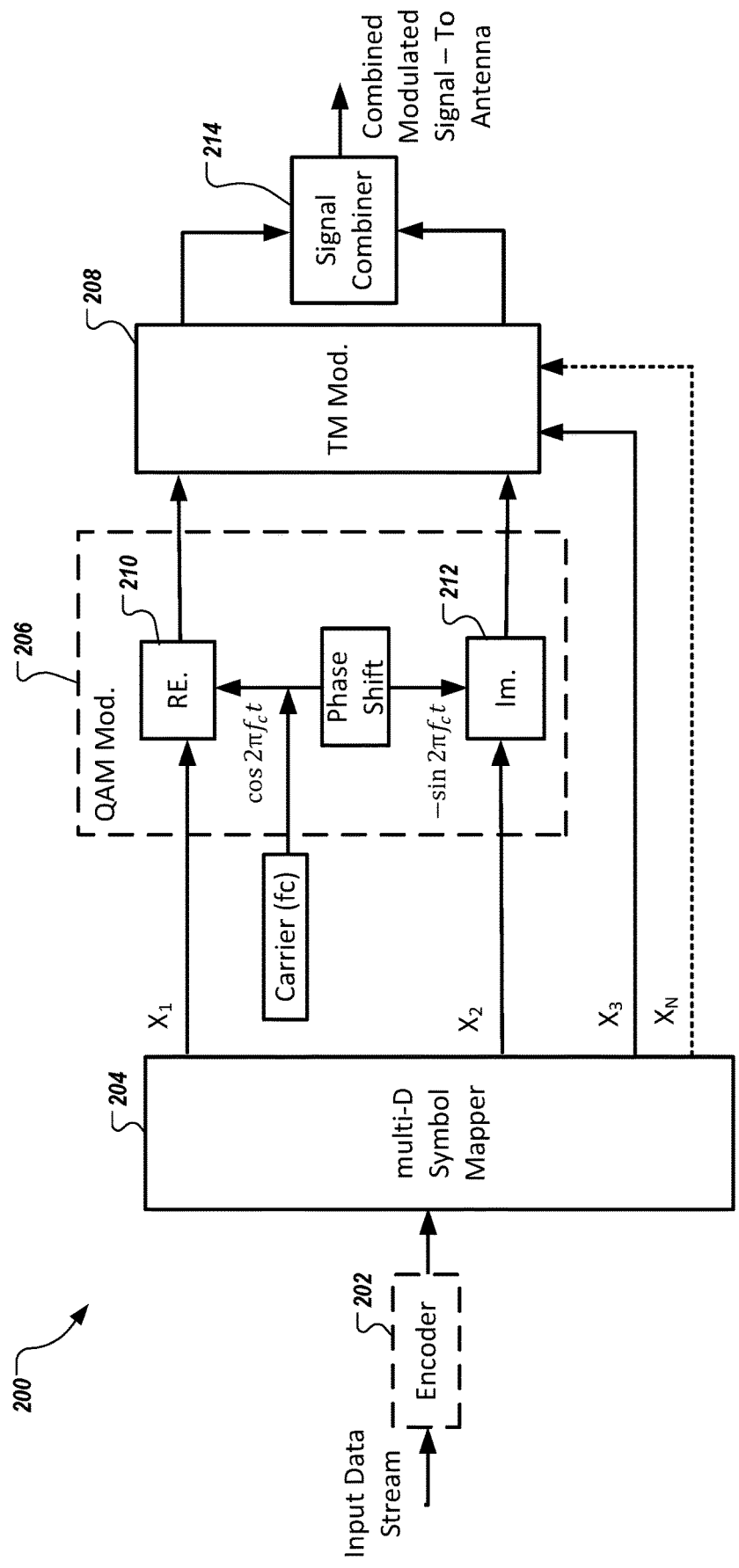
FIG. 2 depicts a block diagram of an example transmitter in accordance with implementations of the present disclosure.

FIG. 2 depicts a block diagram of an example signal transmitter 200 in accordance with implementations of the present disclosure. Transmitter 200 is a combined QAM-TM transmitter. Transmitter 200 can be implemented in hardware (e.g., as integrated circuits, chip-sets, application specific integrated circuits (ASIC) or field programmable logic arrays (FPGA)) or in software (e.g., as a software defined radio (SDR)). Transmitter 200 includes a symbol mapper 204, a QAM modulator 206, a TM modulator 208, and a signal combiner 214. In addition, transmitter 200, optionally, includes an encoder 202. Transmitter 200 can also include various filters and amplifiers (not shown) to properly condition signals for transmission.

Encoder 202 receives a data signal from an input data stream. Encoder 202 can encode the input data for error detection/correction, encrypt the data, or both. For example, encoder 202 can apply an error correction or error detection code to the input data. Such error correction or detection codes can include, but are not limited to, parity bits, checksums, forward error correction codes, hashing, and cyclic redundancy checks. In some implementations, encoder 202 can encrypt the input data or add digital signatures to the data.

Symbol mapper 204 maps the input data to symbols in a multi-dimensional symbol constellation. For example, symbol mapper 204 maps sets of N bits of the input data to data symbols an M-ary symbol constellation, where $M=2^N$. The multi-dimensional symbol constellation includes at least three dimensions, where individual symbols are represented by a set of at least three coordinates; one coordinate in each dimension. Furthermore, each symbol represents a particular pattern of N bits of the input data (e.g., an N-bit binary number). Symbol coordinates are of one or more of the dimensions are represented by modulation values of a QAM (e.g., non-TM signal) and symbol coordinates of one or more other dimensions are represented by modulation values of a TM signal or multiple TM signals.

Figure 3:
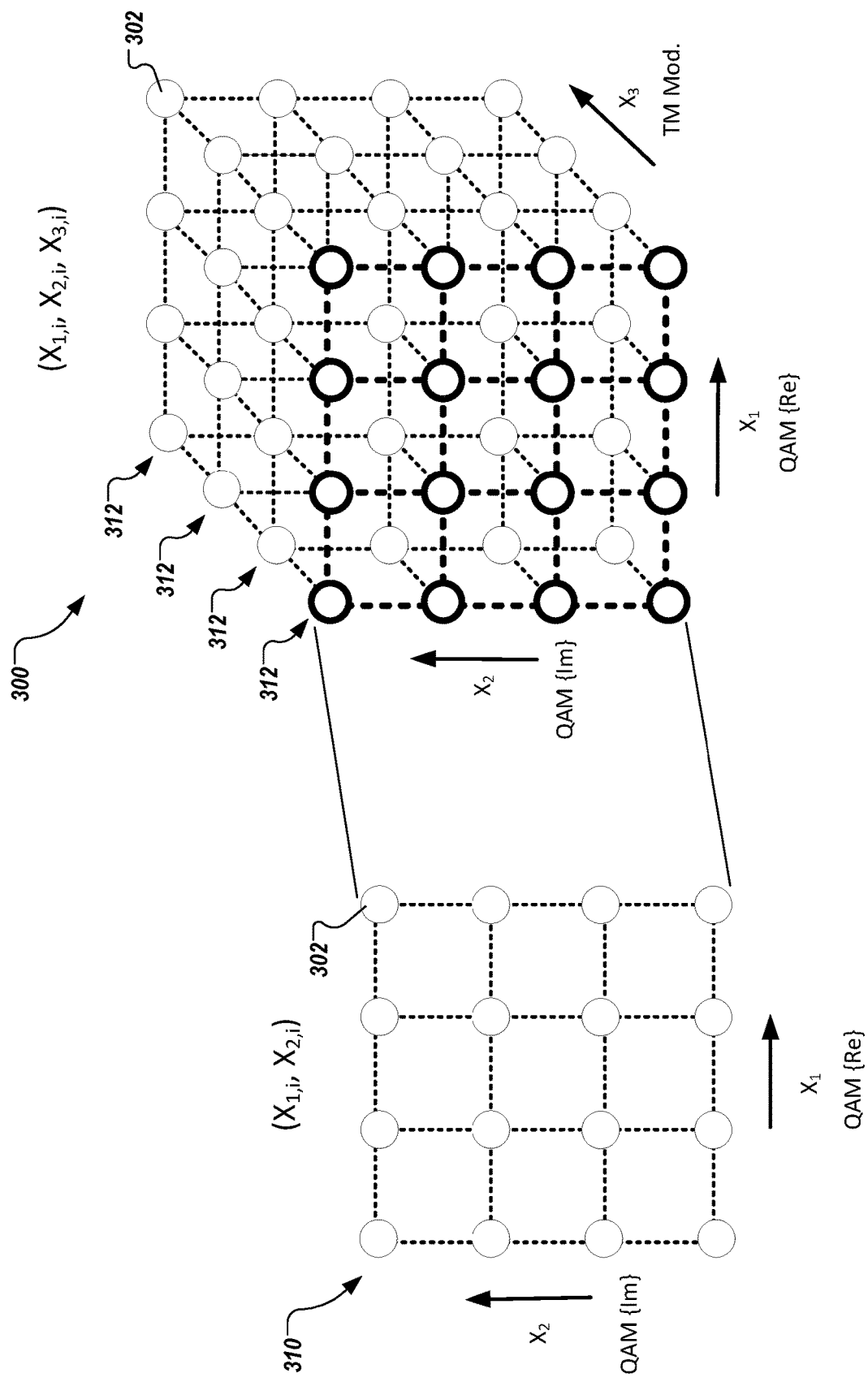
FIG. 3 depicts a diagram of an exemplary multi-dimensional symbol constellation in accordance with implementations of the present disclosure.

For example, FIG. 3 illustrates a diagram of an exemplary multi-dimensional symbol constellation 300. The constellation 300 is a three-dimensional, 64-ary constellation. Constellation 300 includes 64 data symbols 302 that each represent a unique pattern of 6 bits. Each symbol 302 is represented by coordinates in each of the three constellation dimensions ($X_1$, $X_2$, and $X_3$). Symbol coordinates in each dimension are, in turn, represented by modulation values of respective modulation signals.

For example, symbol coordinates in the $X_1$ dimension can be represented by modulation values of the real part (or in-phase part) of a QAM signal ($QAM_{\{Re\}}$), symbol coordinates in the $X_2$ dimension can be represented by modulation values of the imaginary part (or quadrature-phase part) of the QAM signal, and symbol coordinates in the $X_3$ dimension can be represented by modulation values a TM signal (TM). The real and imaginary parts of the QAM signal are designated as $QAM_{\{Re\}}$ and $QAM_{\{Im\}}$, respectively. For example, an i-th symbol 302 may represent the bit patterns (011010b), and may itself be represented by a set of modulation values ($X_{1,i}$, $X_{2,i}$, $X_{3,i}$), where $X_{1,i}=QAM_{\{Re\},i}$, $X_{2,i}=QAM_{\{Im\},i}$, and $X_{3,i}=TM_i$.

Referring again to FIG. 2, symbol mapper generates modulation signals $X_1$, $X_2$, and $X_3$ to control QAM modulator 206 and TM modulator 208. QAM modulator 206 generates the real and imaginary parts of a QAM signal based on modulation signals $X_1$ and $X_2$. For example, QAM modulator 206 can include two amplitude modulators 210, 212 that each modulate respective in-phase and quadrature-phase channels of a carrier signal. TM modulator 208 generates a TM signal based on modulation signal $X_3$.

TM modulator 208 can, for example, generate the TM signal using "wide-band TM modulation" techniques, "harmonic TM modulation" techniques, or "internal TM modulation" techniques. For example, in "wide-band TM modulation" techniques data is encoded in the TM signal by variations the location of inflection points of the carrier signal, as described in U.S. Pat. No. 9,515,815 at col. 4:48-9:19, which is incorporated herein by reference. Using "wide-band TM modulation" techniques, for example, TM modulator 208 can generate TM signals which represent $X_3$ dimension coordinates of constellation symbols 302 by variations the location of inflection points of the carrier signal.

As another example, in "harmonic TM modulation" techniques data is encoded in time or phase shifts of a harmonic of the carrier signal, which is heterodyned back to the fundamental frequency of the carrier signal, as described in U.S. Pat. No. 9,515,815 at col. 10:61-13:4 and U.S. Pat. No. 9,338,042 at col. 6:30-8:4, both of which are incorporated herein by reference. Using "harmonic TM modulation" techniques, for example, TM modulator 208 can generate TM signals which represent $X_3$ dimension coordinates of constellation symbols 302 by time or phase shifts of the carrier harmonic.

As another example, in "internal TM modulation" techniques data can be encoded in time/phase shifts, amplitude shifts, or both time/phase shifts and amplitude shifts of an internal TM signal, which can be applied to the phase or the frequency of the carrier signal, as described in U.S. patent application Ser. No. 15/491,569 at pp. 14-25 and 31-33, which is incorporated herein by reference.

For example, in "internal TM modulation" the internal TM signal is chosen and modulated so as to be self-canceling within symbol periods of the non-TM signal with which it is combined, and preserves the feature of transparency with respect to the non-TM signal. The "internal TM signal" can be applied to the carrier by adding the internal TM signal to the carrier's phase or frequency.

Using "internal TM modulation" techniques, for example, TM modulator 208 can generate TM signals which represent $X_3$ dimension coordinates of constellation symbols 302 by variations the location of time/phase shifts, amplitude shifts, or both time/phase shifts and amplitude shifts of the internal TM signal.

For example, as discussed in U.S. patent application Ser. No. 15/491,569, internal TM modulation involves encoding data from an input data stream within discrete phase shifts, time shifts, or amplitude shifts of an internal modulation signal (also referred to as an "internal TM signal" or simply the "TM signal" in reference to internal TM modulation). The internal TM signal is periodic signal, for example, a sinusoid or other periodic signal. The internal TM signal has a frequency that is related to the symbol frame (e.g., symbol period and symbol rate) of a non-TM signal (e.g., a QAM signal) with which the TM signal will be combined. For example, the internal TM signal can have a frequency that is an integer multiple of the symbol rate of the non-TM signal.

For internal TM modulation, a TM modulator (e.g., TM modulator 208) modulates a carrier signal with the TM signal by applying the internal TM signal to the carrier signal. Internal TM modulation differs from traditional phase modulation in that the phase of the carrier signal is not directly modulated or altered based on the input data signal. Instead, the internal TM signal is modulated with the data signal and the entire sinusoidal internal TM signal is applied to the carrier by, for example, inserting the entire sinusoidal internal TM signal into the phase or frequency of the carrier signal. The data of the data signal is encoded in a phase, time shift, amplitude shift or a combination thereof of the internal TM signal and not directly in the carrier. Moreover, because the internal TM signal is periodic, variations in the phase of the carrier caused by the internal TM signal are averaged out over an integer number cycles of the internal TM signal.

TM modulator 208 can add TM modulation to either the in-phase and quadrature-phase of the carrier signal that is received from the QAM modulator 206. Signal combiner 214 combines the QAM and TM modulated in-phase and quadrature-phase of the carrier signal passes the combined signal to the transmission amplifiers and antenna of the transmitter 200.

Although illustrated as receiving the QAM modulated carrier signal from QAM modulator 206, in some implementations, TM modulator 208 can be placed before the QAM modulator 206 to modulate the carrier with the TM signal first and then send the TM modulated carrier to the QAM modulator 206.

Referring to FIGS. 2 and 3, in some implementations, constellation 300 can be arranged as a set of two-dimensional QAM symbol constellations 310. Symbols 302 in the QAM constellations 310 are represented by respective modulation levels of the real portion of the QAM signal ($QAM_{\{Re\}}$) and imaginary portion of the QAM signal ($QAM_{\{Im\}}$). Constellation 300 can then include a plurality of layers of two-dimensional QAM symbol constellations 310, where each QAM constellation layer 312 (e.g., the $X_3$ dimensions of constellation 300) is represented by a modulation value of a TM signal. For example, the 16 symbols 302 in each 16-ary QAM constellation 310 can represent the 16 binary values ranging from 0 (0000b) to 15 (1111b). In other, words the QAM constellations can remain constant in each layer 312. Moreover, to minimize bit errors, the bit patterns represented by each symbol in the QAM constellation 310 can be arranged according to a Gray code, such that each adjacent symbol differs by only one bit. The TM signal is used to represent each QAM constellation layer 312 and, with four layers, permits an additional two bits to be appended to each symbol in the full three-dimensional constellation 300. By using the TM signal to represent layers 312 of QAM constellations Gray coding can be preserved even between QAM constellation layers. For example, the first constellation layer 312 (beginning from the front as showing in FIG. 3) may represent 16 binary values ranging from 0 (00 0000b) to 15 (00 1111b); the second constellation layer 312 may represent 16 binary values ranging from 16 (01 0000b) to 31 (01 1111b); the third constellation layer 312 may represent 16 binary values ranging from 48 (11 0000b) to 63 (11 1111b); and the fourth constellation layer 312 may represent 16 binary values ranging from 32 (10 0000b) to 47 (10 1111b), thereby preserving Gray coding between layers.

Constellation 300 can include N layers of M-ary QAM constellation layers 312. For example, constellation 300 can include four layers of 16-QAM constellations to produce a 64-ary three-dimensional constellation. Constellation 300 can include eight layers of 64-QAM constellations to produce a 512-ary three-dimensional constellation. Constellation 300 can include sixteen layers of 256-QAM constellations to produce a 4096-ary three-dimensional constellation. In some implementations, for example, wired communication systems such as powerline Ethernet and coaxial cable or microwave backhaul systems, constellation 300 can include 32 layers of 1024-QAM constellations to produce a 32768-ary three-dimensional constellation.

Although illustrated as a square constellation, QAM constellation 310, and corresponding constellation layers 312 can be arranged in various other shapes including, but not limited to rectangular and circular constellations. For example, constellation 300 can include four layers of a circular 16-QAM constellation.

In some implementations, TM modulator 208 can add TM modulation to both the in-phase and quadrature-phase of the carrier signal, according to one of the above TM modulation techniques. For example, TM modulator 208 can generate a real (or in-phase) TM signal ($TM_{\{Re\}}$) and an imaginary (or quadrature-phase) TM signal ($TM_{\{Im\}}$), as described in U.S. Pat. No. 9,515,815 at col. 15:61-16:12, which is incorporated herein by reference. Symbol mapper 204 can map symbol coordinates for third and fourth dimensions of a four-dimensional symbol constellation to the real ($TM_{\{Re\}}$) and imaginary TM signals ($TM_{\{Im\}}$), respectively.

As discussed above and in U.S. patent application Ser. No. 15/491,569, "internal TM modulation" techniques can be used to carry information in both phase shifts and amplitude shifts of a TM signal. Accordingly, in some implementations, for example, those using "internal TM modulation" techniques, symbol coordinates in a third and fourth dimension of a symbol constellation can be represented, respectively, by phase shift values ($TM_\varphi$) and amplitude shift values ($TM_A$) of a single TM signal.

In some implementations, two TM signals can be used to expand a multi-dimensional constellation to six dimensions. For example, symbol coordinates in a third and fourth dimension of a symbol constellation can be represented, respectively, by phase shift values and amplitude shift values of a real TM signal ($TM_{\varphi,\{Re\}}$ and $TM_{A,\{Re\}}$) and symbol coordinates in a fifth and sixth dimension of a symbol constellation can be represented, respectively, by phase shift values and amplitude shift values of an imaginary TM signal ($TM_{\varphi,\{Im\}}$ and $TM_{A,\{Im\}}$) for a six-dimension constellation. In other words, TM signals can be used to add an additional one to four dimensions to QAM symbol constellations. For example, a 256-ary four-dimensional constellation can include four dimensions each with four coordinates. A 65536-ary four-dimensional constellation can include four dimensions each with sixteen coordinates. Similarly, a 4096-ary six-dimensional constellation can include six dimensions each with four coordinates.

In some implementations, multi-dimensional symbol constellations that do not represent an integer number of bits can be used. For example, a 640-ary three-dimensional symbol constellation can be used. The 640-ary three-dimensional constellation can include two dimensions that each have eight coordinates (e.g., a 64-ary QAM constellation) and one dimension that includes ten coordinates (e.g., represented by modulation values of a TM signal). This constellation can only represent nine bits of information (e.g., $\log_2(640)$ =9.322 bits). The constellation will include 128 extra symbols (e.g., $640-2^9=128$). These extra 128 symbols can be reserved. For example, the extra 128 symbols can be used to transmit system information between transmitters and receivers. Each of the 128 symbols can represent 7-bits of system information. Moreover, when sending the system information using the reserved symbols, there will be no need to send header information or other data to distinguish between data and system information because simply the use of the reserved symbols themselves will distinguish the data as being system information.

In some implementations, symbol coordinates in two dimensions of a three-dimensional constellation can be represented by TM signals and symbol coordinates in the third dimension can be represented by a non-TM signal. For example, symbol coordinates in the first and second dimensions of a constellation can be represented by any combination $TM_{\varphi,\{Re\}}$, $TM_{A,\{Re\}}$, $TM_{\varphi,\{Im\}}$, and $TM_{A,\{Im\}}$; and symbol coordinates in the third dimension of the constellation can be represented by a non-TM signal including, but not limited to, an amplitude modulated signal, a frequency modulated signal, or a phase modulated signal.

Figure 4:
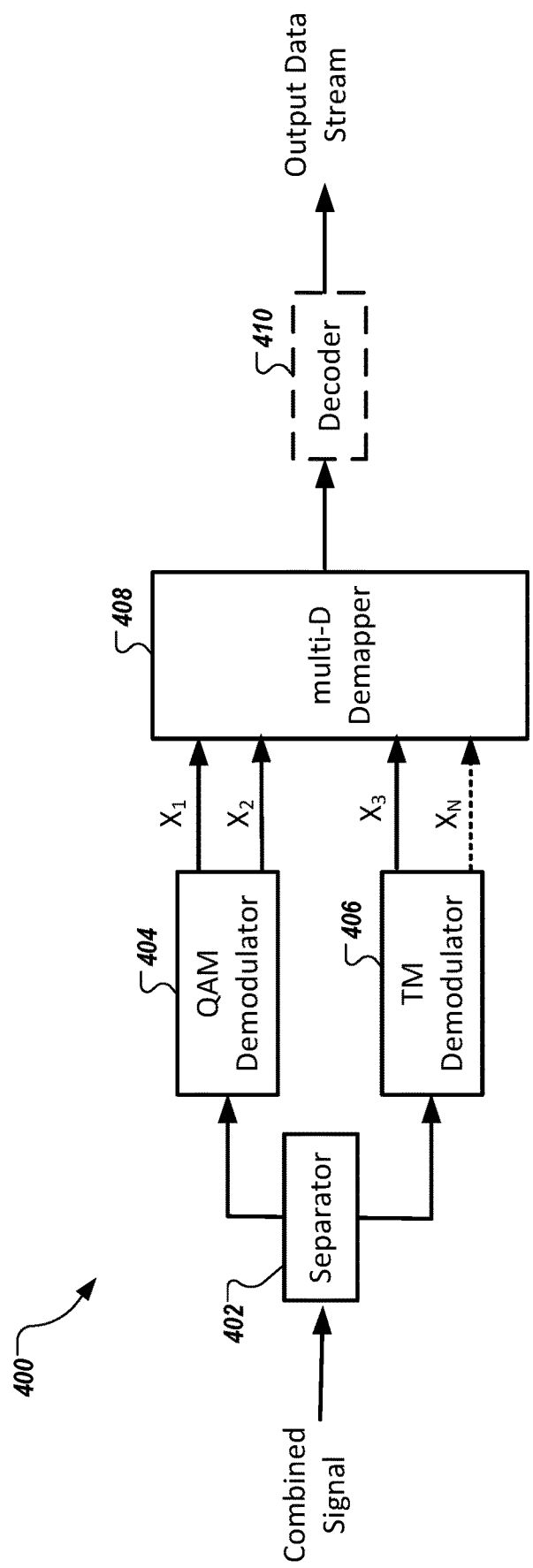
FIG. 4 depicts a block diagram of an example receiver in accordance with implementations of the present disclosure.

FIG. 4 depicts a block diagram of an example signal receiver 400 in accordance with implementations of the present disclosure. Receiver 400 is a combined QAM-TM receiver. Receiver 400 can be implemented in hardware (e.g., as integrated circuits, chip-sets, application specific integrated circuits (ASIC) or field programmable logic arrays (FPGA)) or in software (e.g., as a software defined radio (SDR)). Receiver 400 includes a signal separator 402, a QAM demodulator 404, a TM demodulator 406, and a symbol demapper 408. In addition, receiver 400, optionally, includes a decoder 410. Receiver 400 can also include various filters and amplifiers (not shown) to properly process received signals.

Signal separator 402 receives the combined signal and separates the TM signal. Signal separator 402 passes the TM signal to TM demodulator 406. In some implementations, signal separator 402 can send the combined signal directly to QAM demodulator 404 without further processing because the TM signal will be transparent to the QAM demodulator. In some implementations, QAM demodulator 404 is a part of the signal separator 402. For example, U.S. Pat. No. 9,338,042 at col. 12:18-13:38; 14:14-53, which is incorporated herein by reference, describes techniques for separating TM signals from combined signals which employ a non-TM signal demodulator (e.g., a QAM demodulator).

QAM demodulator 404 demodulates the QAM signal and passes corresponding symbol coordinates for the dimensions $X_1$ and $X_2$ to symbol demapper 408. TM demodulator 406 demodulates the TM signal and passes corresponding coordinates for dimension $X_3$ to symbol demapper 408. In implementations that use multiple TM signals (e.g., $TM_{\varphi,\{Re\}}$, $TM_{A,\{Re\}}$, $TM_{\varphi,\{Im\}}$, and $TM_{A,\{Im\}}$), TM demodulator demodulates the TM signals and passes corresponding coordinates for dimensions $X_3$ to $X_N$ to symbol demapper 408.

TM demodulator 406 can be configured to perform TM demodulation using "wide-band TM modulation" techniques, "harmonic TM modulation" techniques, or "internal TM modulation" techniques, as appropriate. For example, "wide-band TM" demodulation techniques are described in U.S. Pat. No. 9,515,815 at col. 9:20-10:60, which is incorporated herein by reference. "Harmonic TM" demodulation techniques are described in U.S. Pat. No. 9,515,815 at col. 13:5-15:9 and U.S. Pat. No. 9,338,042 at col. 10:66-11:44, both of which are incorporated herein by reference. "Internal TM" demodulation techniques are described in U.S. patent application Ser. No. 15/491,569 at pp. 25-31 and 33-34, which is incorporated herein by reference.

For example, as described in U.S. patent application Ser. No. 15/491,569, for internal TM demodulation, a TM demodulator (e.g., TM demodulator 406) receives a combined signal that includes a carrier signal modulated with both a TM signal and a non-TM signal (e.g., a QAM signal). The TM demodulator demodulates or receives a demodulated version of the QAM signal. The TM demodulator uses the QAM symbol values of the demodulated QAM signal to remove the QAM modulation from the combined signal, thereby, leaving only the TM signal. The TM demodulator can demodulate the TM signal by extracting the TM signal (e.g., the internal TM modulation signal) from the phase of the carrier signal. The TM demodulator identifies the TM symbols by detecting the discrete phase shifts and/or amplitude shifts in the TM signal to demodulate the TM signal. For example, TM receiver 106 can compare the TM signal to a reference sinusoid to detect the phase shifts in the TM signal.

Symbol demapper 408 maps symbol coordinates to symbols in the multi-dimensional constellation and the corresponding bit patterns. For example, the demapper 408 maps the symbol coordinates to symbols and an N-bit binary number that corresponds to the symbol. Symbol demapper 408 can output the remapped bits as a digital data stream.

Decoder 410 receives the demodulated and demapped data stream from symbol demapper 408. Decoder 410 decodes or decrypts any coding or encryption that was added to the data stream by encoder 202 of transmitter 200. In some implementations, decoder 410 can detect or correct errors in the data stream using any error detection/correction codes applied to the data by encoder 202.

Figure 5:
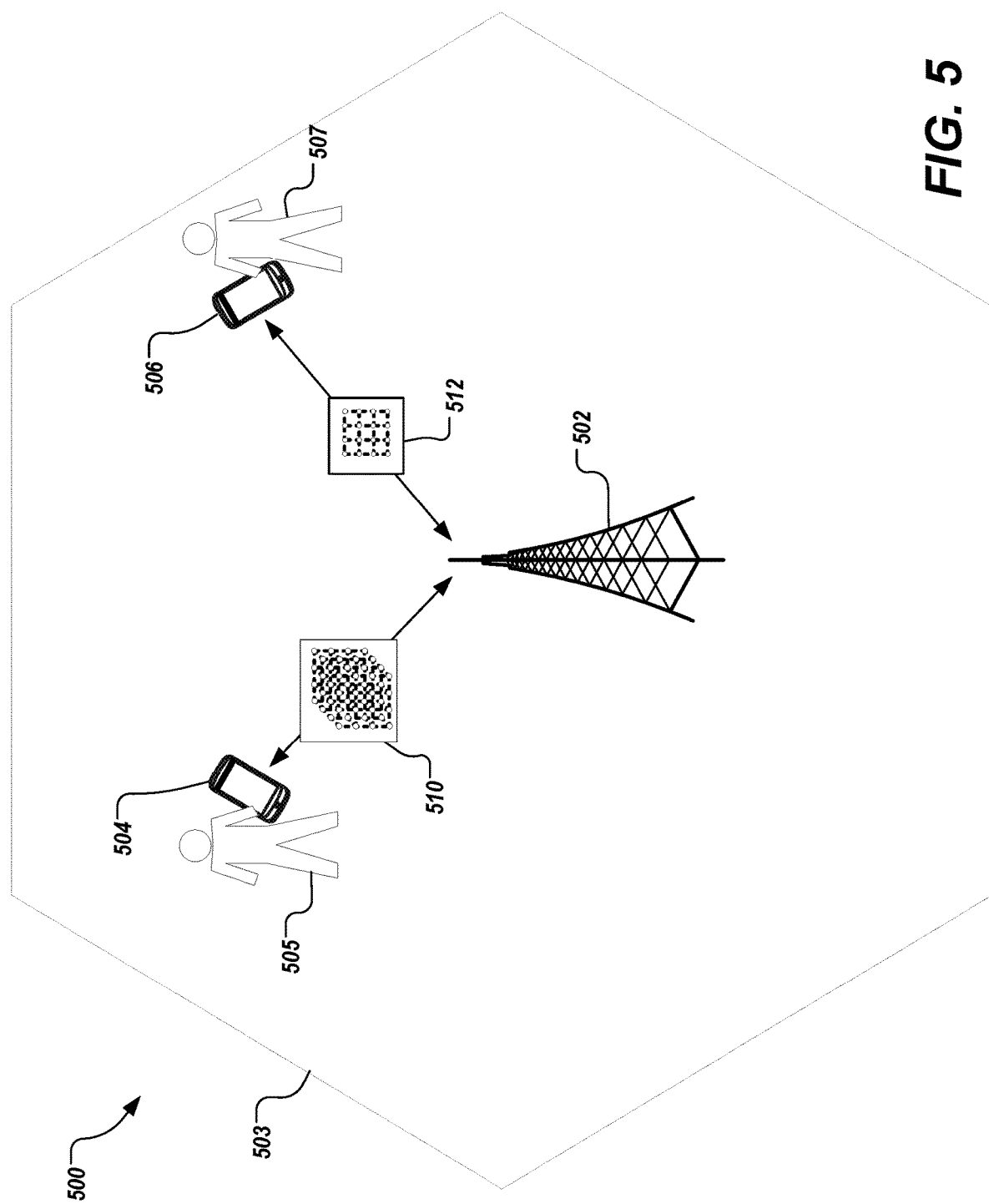
FIG. 5 depicts example system that implements aspects of the present disclosure in the context of a mobile communication environment.

FIG. 5 depicts an example environment 500 for employing the techniques discussed above. The example environment is described in the context of cellular communication network (e.g., a cellular communication front haul network). It is appreciated, however, that implementations of the present disclosure can be realized in other appropriate environments and contexts including, but not limited to, for example, computer networks, Internet of Things (IoT) networks, computer peripherals (e.g., plug and play devices), device pairing, authentication protocols, near-field communications (NFC), inventory systems, broadcast and/or cablecast systems, wired communication systems (e.g., Ethernet, USB), satellite communication systems, self-driving vehicles, autonomous vehicle communications (e.g., unmanned aerial vehicles (UAV)), traffic signal preemption systems (e.g., used by emergency service vehicles), etc.

The environment 500 includes a base station 502 in communication with several mobile devices 504 and 506. The base station 502 can be a radio base station (RBS) for a cellular communication system. The base station 502 can include cellular transmitters, receivers, and computing equipment for processing cellular communications with the mobile devices 504 and 506. In addition, the base station 502 is capable of conducting electronic communications with TM modulated signals. For example, the base station 502 can include QAM-TM transmitter(s) and QAM-TM receiver(s) such as those described above in reference to FIGS. 2 and 4, respectively. It is appreciated, however, that in other contexts communication devices such as a router, server, wireless access point, etc. could perform the operations similar to those described in reference to the base station 502.

The mobile devices 504 and 506 are associated with respective users 505 and 507. The mobile devices 504 and 506 can each include various forms of a processing device including, but not limited to, a laptop computer, a tablet computer, a wearable computer, a handheld computer, a personal digital assistant (PDA), a cellular telephone, a network appliance, a smart phone, an enhanced general packet radio service (EGPRS) mobile phone, a mobile hotspot, or an appropriate combination of any two or more of these example communication devices or other communication devices. Furthermore, mobile devices 504 and 506 are capable of conducting electronic communications with TM modulated signals. For example, the mobile devices 504 and 506 can each include a QAM-TM transmitter and a QAM-TM receiver such as those described below in reference to FIGS. 2 and 4, respectively.

Moreover, QAM-TM transmitters and receivers can be configured to operate in a QAM only mode in which only QAM (or another non-TM modulation) is used, a TM only mode in which only TM modulation is used, or a QAM-TM mode in which both QAM and TM modulation are used. Furthermore, when operating in a QAM-TM mode, the QAM-TM transmitters and receivers can transmit and receive data using multi-dimensional symbol constellations having three or more dimensions, as described above. In addition, QAM-TM transmitters and receivers can expand and contract the symbol constellation being used or to be used for communication in accordance with conditions of a given communication channel, types or amounts of data being sent, or other appropriate conditions. In other words, the base station 502 and mobile devices 504 and 506 can choose a communication mode (e.g., QAM only, TM only, or QAM-TM) based on conditions including, but not limited to, received signal strength, channel error rate, type of data to be sent, amount of data sent, or a combination thereof.

For example, if particular types of data or an amount of data larger than a predetermined size ("large amounts of data") are being transmitted the base station 502 or mobile device 504 can use a QAM-TM constellation 510 to transmit the particular type of data or the large amount of data. For example, particular types of data that can trigger the use of TM signals 142 can include, but are not limited to, data types that use significant portions of a channel bandwidth such as streaming data (e.g., streaming video or audio), real time data (e.g., video chat), analog data (e.g., analog direct current (DC) or alternating current (AC) signals), and data indicated as high priority (e.g., emergency notification data). However, if smaller amounts of data are being transmitted, for example, the base station 502 or mobile device 506 can use a smaller QAM only or TM only constellation 512. In some examples, low bandwidth data (e.g., SMS messages, text only e-mail messages, etc.) may be prioritized for transmission using QAM or TM only constellations 512.

In some implementations, the base station 502 and mobile devices 504 and 506 can vary attributes of the multidimensional constellation to be used. For example, attributes such as number of dimensions and constellation size can be chosen based on conditions including, but not limited to, received signal strength, channel error rate, type of data to be sent, amount of data sent, or a combination thereof.

Figure 6:
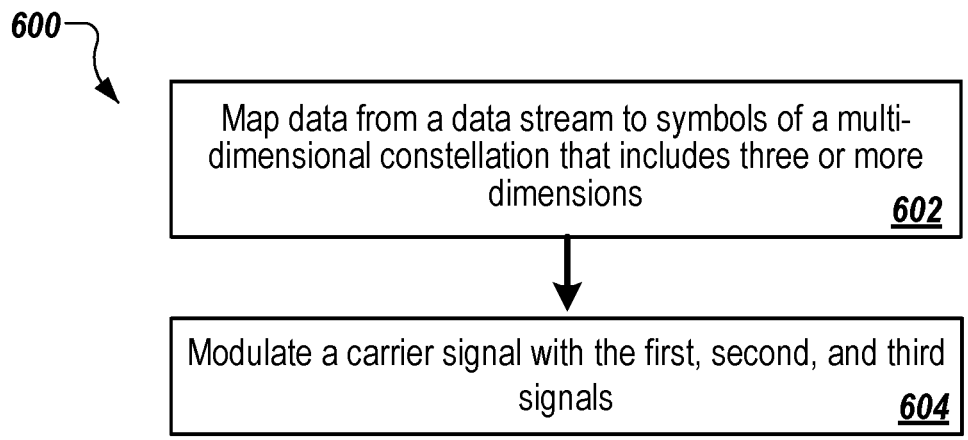
FIGS. 6 and 7 depict example processes that can be executed in accordance with implementations of the present disclosure.

FIG. 6 depicts an example process 600 for encoding a communication signal in a multi-dimensional symbol constellation. Process 600 can be performed by a transmitter such as transmitter 200 of FIG. 2. In some examples, the example process 600 can be provided as computer-executable instructions executed using one or more processing devices (e.g., a digital signal processor) or communication devices (e.g., base station 502 or mobile devices 504 and 506 of FIG. 5). In some examples, the process 600 may be hardwired electrical circuitry, for example, as an ASIC or an FPGA device. In some examples, the process 900 may be executed by an SDR.

A transmitter maps data from an input data stream to symbols of a multi-dimensional constellation that includes three or more dimensions (602). For example, bits of an input data stream are mapped to symbols of the multi-dimensional constellation that represent corresponding bit patterns. The symbols of the constellation can be represented by a respective set of coordinates including a first coordinate associated with a first signal, a second coordinate associated with a second signal, and a third coordinate associated with a third signal, where at least one of the signals is a TM signal and at least one of the signals is a non-TM signal. For example, the symbol coordinates of the first dimension and second dimensions can be represented by respective in-phase and quadrature phase modulation values of a QAM signal. Symbol coordinates of the third dimension can be represented by a TM signal.

The transmitter modulates a carrier signal with the first, second, and third signals (604). For example, the first and second signal can be a in-phase and quadrature-phases of a QAM signal and the third signal can be a TM signal. The transmitter can then modulate the carrier with the QAM and TM signals.

In some implementation, the multi-dimensional symbol constellation can be composed of a plurality of layers of two-dimensional QAM constellations, where TM modulation levels represent particular QAM constellation layers. For example, the multi-dimensional symbol constellation can include at least four layers of 16-ary QAM constellations. As another example, the multi-dimensional symbol constellation can include at least eight layers of 256-ary QAM constellations.

In some implementations, the third dimension of the multi-dimensional symbol constellation can be represented by phase values of the TM signal, and a fourth dimension of the multi-dimensional symbol constellation can be represented by amplitude values of the TM signal.

Some implementations include two TM signals where a first TM signal is applied to an in-phase channel of a carrier signal and a second TM signal is applied to a quadrature-phase channel of the carrier signal. Symbol coordinates for a third dimension of the multi-dimensional constellation can be represented by the first TM signal. Symbol coordinates for a fourth dimension of the multi-dimensional constellation can be represented by the second TM signal. The transmitter can then modulate the in-phase part of the carrier signal a with the first TM signal, and the quadrature-phase part of the carrier signal with the second TM signal.

In some implementations, a transmitter can use a two-dimensional symbol constellation where symbol coordinates in one dimension of the constellation are represented by modulation values of a non-TM signal and symbol coordinates in the second dimension of the constellation are represented by modulation values of the TM signal. The non-TM signal can be, for example, an amplitude modulation signal, a frequency modulation signal (e.g., FSK), or a phase modulation signal (e.g., QPSK). For example, it may be advantageous in some communication channels or under some channel conditions (e.g., noisy or channels with much multipath interference) to use a lower dimensional constellation. Furthermore, in some channels or under some channel conditions a combination of a non-TM signal with a TM signal may provide improved performance over a QAM signal, thereby, permitting the use of a two-dimensional constellation, where the use of QAM would otherwise not be feasible.

In some implementations, a transmitter can use a two-dimensional symbol constellation where symbol coordinates in both dimensions are represented by TM signal(s). For example, if an "internal TM modulation" technique is used, symbol coordinates in one dimension of the constellation are represented by phase values of a TM signal and symbol coordinates in the second dimension of the constellation are represented by amplitude values of the TM signal. In some implementations, symbol coordinates in one dimension of the constellation can be represented by a first TM signal applied to an in-phase portion of a carrier signal and symbol coordinates in the second dimension of the constellation can be represented by a second TM signal applied to a quadrature-phase portion of the carrier signal. For example, it may be advantageous in some communication channels or under some channel conditions (e.g., noisy channels, channels with significant Doppler shifts, or channels with significant multipath interference) to use only TM signals. For instance, in some channels or under some channel conditions TM signals may provide improved performance over a QAM signal, thereby, permitting the use of a two-dimensional constellation, where the use of QAM would otherwise not be feasible.

Figure 7:
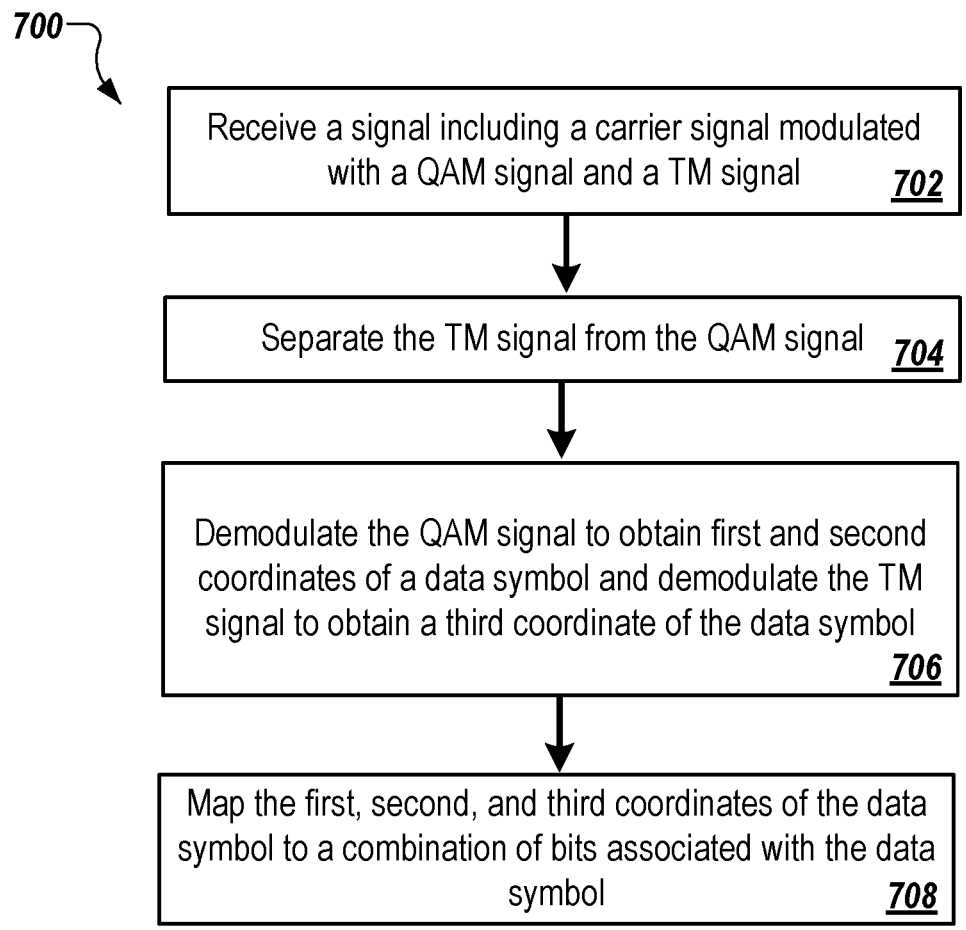

FIG. 7 depicts an example process 700 for decoding a communication signal from a multi-dimensional symbol constellation. Process 700 can be performed by a receiver such as receiver 400 of FIG. 4. In some examples, the example process 700 can be provided as computer-executable instructions executed using one or more processing devices (e.g., a digital signal processor) or communication devices (e.g., base station 502 or mobile devices 504 and 506 of FIG. 5). In some examples, the process 700 may be hardwired electrical circuitry, for example, as an ASIC or an FPGA device. In some examples, the process 900 may be executed by an SDR.

A receiver receives a signal including a carrier signal modulated with a QAM signal and a TM signal, where the signal encodes data in a multi-dimensional symbol constellation that has at least three dimensions (702). The receiver separates the TM signal from the QAM signal (704). The receiver demodulates the QAM signal to obtain first and second coordinates of a data symbol and demodulates the TM signal to obtain a third coordinate of the data symbol (706). The receiver maps the first, second, and third coordinates of the data symbol to a pattern of N-bits associated with the data symbol (708).

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Communication devices can be configured to perform the processes and logic flows described in this specification. For example, communication devices can include installed hardware, firmware, and/or software which, when the software is executed by the hardware, the above described processes and logic flows are performed. For example, communication devices can include one or more programmable processors executing one or more computer programs to perform the processes and logic flows described in this specification. The processes and logic flows can also be performed by, and apparatus can also be implemented as, special purpose logic circuitry, e.g., an FPGA (field programmable gate array) or an ASIC (application specific integrated circuit). For example, communication devices can include special purpose logic circuitry, e.g., an FPGA (field programmable gate array) or an ASIC (application specific integrated circuit) that is configured or programed to perform the processes and logic flows described in this specification.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A transmitter comprising:
   at least one processor; and
   a data store coupled to the at least one processor having instructions stored thereon which, when executed by the at least one processor, causes the at least one processor to perform operations comprising:
   mapping data to symbols of a multi-dimensional constellation comprising at least two dimensions, the symbols of the constellation represented by a respective sets of coordinates that each include a first coordinate associated with a non-TM signal having a modulation signal, and a second coordinate associated with a phase or an amplitude of a transpositional modulation (TM) signal, wherein the second coordinate of each of the respective sets of coordinates is associated a phase value of the TM signal and a third coordinate of each of the respective sets of coordinates is associated an amplitude value of the TM signal;
   modulating a carrier signal with the non-TM signal and the TM signal.

2. The transmitter of claim 1, wherein the multi-dimensional constellation comprises four dimensions,
   wherein the respective sets of coordinates each further include a fourth coordinate associated with a second TM signal,
   wherein first and second signals are respective in-phase and quadrature-phase portions of a QAM signal and a third signal is a first TM signal, and
   wherein modulating the carrier signal comprises modulating the carrier signal with the QAM signal, the first TM signal, and the second TM signal.

3. The transmitter of claim 1, wherein the multi-dimensional constellation comprises four dimensions,
   wherein the respective sets of coordinates each further include a fourth coordinate associated with one of a phase value or an amplitude value of the TM signal, and
   wherein a third coordinate of each of the respective sets of coordinates is associated with the other one of a phase value or an amplitude value of the TM signal.

4. The transmitter of claim 1, wherein the multi-dimensional symbol constellation comprises a plurality of layers of two-dimensional QAM constellations and modulation values of the TM signal represent particular QAM constellation layers.

5. The transmitter of claim 4, wherein the multi-dimensional symbol constellation comprises at least four layers of 16-ary QAM constellations.

6. The transmitter of claim 1, wherein adjacent symbols in the multi-dimensional constellation are encoded using Gray coding.

7. The transmitter of claim 1, wherein the operations further comprise encoding the data using an error correction coding scheme before mapping the data to symbols of the multidimensional constellation.

8. The transmitter of claim 1, wherein the first modulation signal is an amplitude modulation signal, a frequency modulation signal, or a phase modulation signal.

9. A receiver comprising:
   at least one processor; and
   a data store coupled to the at least one processor having instructions stored thereon which, when executed by the at least one processor, causes the at least one processor to perform operations comprising:
   receiving a combined signal including a carrier signal modulated with a transpositional modulated (TM) signal and a non-TM signal, the combined signal encoding digital data in a multi-dimensional symbol constellation;
   separating the TM signal from the non-TM signal;
   demodulating the non-TM signal to obtain a first coordinate of a symbol; and
   demodulating a phase or an amplitude of the TM signal to obtain a second coordinate of the symbol, wherein the second coordinate of each of the respective sets of coordinates is associated a phase value of the TM signal and a third coordinate of each of the respective sets of coordinates is associated an amplitude value of the TM signal.

10. The receiver of claim 9, wherein the operations further comprise mapping the first and second coordinates of the symbol to a pattern of bits associated with the symbol.

11. The receiver of claim 9, wherein demodulating the TM signal comprises:
    demodulating a phase value of the TM signal to obtain a third coordinate of the symbol, and
    demodulating an amplitude value of the TM signal to obtain a fourth coordinate of the symbol.

12. A data communication method comprising:
    mapping data to symbols of a multi-dimensional constellation comprising at least two dimensions, the symbols of the constellation represented by a respective sets of coordinates that each include a first coordinate associated with a non-TM signal, and a second coordinate associated with a phase or an amplitude of a transpositional modulation (TM) signal, wherein the second coordinate of each of the respective sets of coordinates is associated a phase value of the TM signal and a third coordinate of each of the respective sets of coordinates is associated an amplitude value of the TM signal;
    modulating a carrier signal with the non-TM signal and the TM signal.

13. The method of claim 12, wherein the multi-dimensional constellation comprises four dimensions,
    wherein the respective sets of coordinates each further include a fourth coordinate associated with a second TM signal,
    wherein the non-TM and the TM signal are respective in-phase and quadrature-phase First portions of a QAM signal and the third signal is a first TM signal, and
    wherein modulating the carrier signal comprises modulating the carrier signal with the QAM signal, the first TM signal, and the second TM signal.

14. The method of claim 12, wherein the multi-dimensional symbol constellation comprises a plurality of layers of two-dimensional QAM constellations and modulation values of the TM signal represent particular QAM constellation layers.

15. The method of claim 12, wherein the multi-dimensional symbol constellation comprises at least four layers of 16-ary QAM constellations.

16. The method of claim 15, wherein adjacent symbols in the multi-dimensional constellation are encoded using Gray coding.

17. The method of claim 12, further comprising encoding the data using an error correction coding scheme before mapping the data to symbols of the multi-dimensional constellation.

18. The method of claim 12, wherein the non-TM signal is an amplitude modulation signal, a frequency modulation signal, or a phase modulation signal.

\* \* \* \* \*